Feb. 14, 1961     R. Y. CASE     2,971,392
NON-ARTICULATED GEARED METAL BELT
Filed June 24, 1957
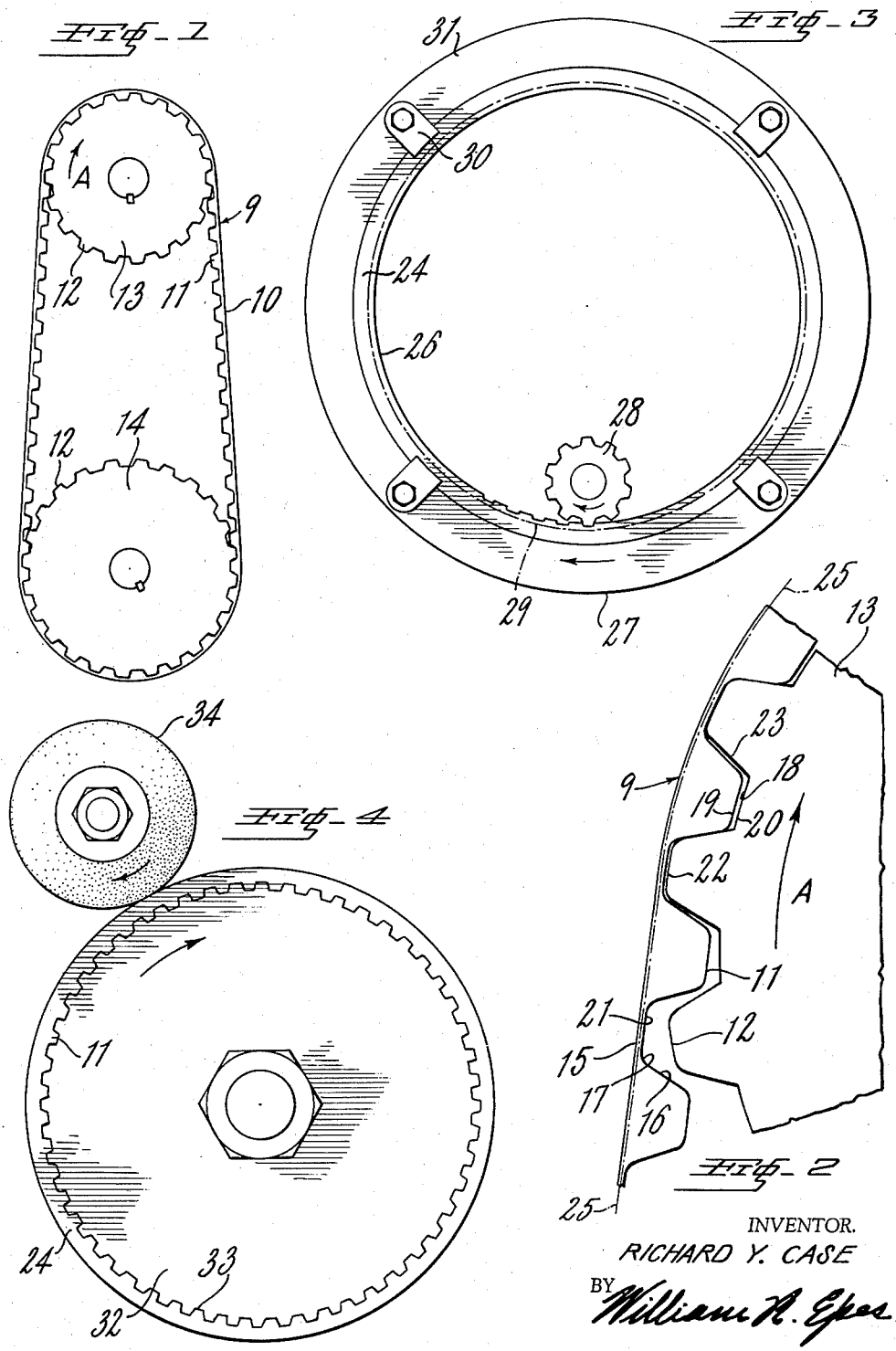
INVENTOR.
RICHARD Y. CASE
BY *William R. Epes*
ATTORNEY United States Patent Office 2,971,392
Patented Feb. 14, 1961

2,971,392

NON-ARTICULATED GEARED METAL BELT

Richard Y. Case, Philadelphia, Pa., assignor to United States Rubber Company, New York, N.Y., a corporation of New Jersey Filed June 24, 1957, Ser. No. 667,426

1 Claim. (Cl. 74—231)

This invention relates to a geared metal belt having a non-articulated load carrying band provided with gear teeth formed from the same body of metal as the band to which it is molecularly bonded. This invention also relates to the method of making the belt.

The belt embodying this invention may be used advantageously in drives where the belt is subjected to high and extremely low temperatures, or lubricating oil, or where the belt operates at high speeds, and it is particularly useful where two or more of the foregoing operating conditions are present.

Heretofore, geared power transmission belts have been made of metal which is adapted to operate at high temperatures and in lubricating oil, but such prior belts are not suitable for quiet, high speed drives because of their massive construction involving a plurality of parts joined together.

Geared power transmission belts also have been made of plastics, including rubber which have been combined with reinforcing materials such as wire or textile cord. The plastics used are not satisfactory for some installations, because they deteriorate under the effects of high temperatures, and lubricating oils, and they do not bond to the reinforcing materials with the required strength.

The belt embodying this invention is an improvement over the prior belts in that the non-articulated metal construction having metal teeth molecularly bonded in the relatively thin load carrying band gives the belt the necessary characteristics to efficiently operate at high speeds under conditions which the prior belts were not capable of so operating. Conventional rubber or plastic belts as described above, or metallic belts having parts joined together, hollowed teeth or other weaknesses are not satisfactory in guided missile work, inasmuch as the missile enters extremely high and extremely low temperature ranges, which temperatures would weaken and eventually cause belt destruction. One of the primary uses of the belt of this invention is in fulfilling the stringent engineering demands in guided missile development.

This invention will be further described in reference to the accompanying drawings, in which:

Fig. 1 is a side elevational view of a belt embodying this invention shown in mesh with two gears;

Fig. 2 is an enlarged side elevational view of a portion of the belt and a portion of one of cooperating gears, which shows portions of the belt before, during, and after engagement with the gear; and Figs. 3 and 4 illustrate a method of making the belt shown in Figs. 1 and 2 from a ring of metal, which is shown in one stage of manufacture in Fig. 3 and in another in Fig. 4.

Referring to Figs. 1 and 2 of the drawings, the belt 9 embodying this invention is made of metal in which all parts are molecularly bonded together in an integral non-articulated unit. The belt 9 comprises a load carrying band 10 having teeth 11 formed thereon, which are adapted to mesh with the gear teeth 12 on the gears 13 and 14. The band 10 and the teeth 11 in any particular section of the band are formed from the same body of metal having suitable characteristics, which for example, may be stainless steel having a tensile strength of 200,000 p.s.i., and the chemical content of .04% carbon, 16.5% of chromium, 3.75% of nickel, 3.75% of copper, and 75.96% iron.

An enlarged side elevational view of a portion of the belt 9 is shown in Fig. 2 as it meshes with a portion of the driving gear 13 which rotates in the direction of the arrow A. The teeth 11 are so shaped and spaced along the belt 9 that they will mesh with the teeth 12 on the gear 13 in accordance with the usual gearing practice. The band 10 in the sections 15 extending between the teeth 11 of the band is relatively thin, so that the band will be flexible in such sections. It has been found, for example that the thickness of the band 10 in the thin sections 15 between the teeth may be .005 inch to provide the necessary flexibility to operate on gears having an addendum diameter of 1½ inches or greater. The sections 15 may be thicker where the belt is adapted to operate on larger gears. The faces 16 of the teeth 11 are connected to the relatively thin sections 15 of the load carrying band 10 by fillets of metal 17, which for example, may have radii of .020 inch of a circle which is tangent to the face of the tooth and the thin section 15 of the band 10. The purpose of the fillets 17 is to provide the sections 15 with progressively increasing flexibility as the fillets merge with the thinner sections 15 and thereby increase the resistance of the formation of sharp bends in the band 10, which produce permanent deformation, or strains in the metal. It will be understood that the shape of the fillets may be varied to accomplish such purpose. A suitable amount of clearance 18 is provided between the addendum line 19 of the belt teeth 11 and the clearance line 20 of the gear teeth 12 on the gear 13. The dedendum line 21 of the belt teeth on the band 10 makes direct contact with the addendum gear 22 of the gear teeth 12, when the teeth of the belt and gear are in full mesh. A suitable amount of back lash 23 is usually provided between the belt and gear teeth 11 and 12. However, the back lash may be reduced to a negligible quantity, particularly when the belt teeth 11 are short.

The belt 9 may be made of a forged and machined ring 24 of steel as illustrated in Fig. 3. For example, the ring 24 is forged from a steel billet by forming a hole therein of considerably smaller diameter than the finished inside diameter of the ring 24, and then expanding the diameter of the hole by forging the ring in accordance with conventional practice to approximately the size of the internal diameter of the ring, so that the grain of the steel in the ring will extend circumferentially thereof. The ring is then machined to the size required to form the belt 9 having a pitch line 25 of the length required for a certain number of teeth of a selected pitch. The inside periphery 26 of the ring 24 forms the top or addendum line 19 of the belt teeth. The teeth 11 of the belt 9 may be cut on the ring 24 by a gear cutting machine 27 provided with a pinion-shaped cutter 28 of the well-known Fellows type, in which the cutter 28 is moved up and down parallel to the center line of the ring 24 in order to give the cutting action, and at the same time the cutter and the ring are rotated at the same linear pitch line speeds. In this case the pitch circle of the cutter is concentric to but lies outside of the cutter and tangent to the circle 29 of the ring 24, which becomes the pitch line 25 of the belt 9. The cutter 28 cuts on its downward stroke only, and is moved inwardly away from the ring on its upward stroke so that it contacts the ring only when cutting. The ring 24 is held by clamps 30 in a rotatable head 31, which is geared to the cutter 27 to rotate therewith, so that the linear speeds of their pitch circles are equal.

The thickness of the ring 24, or the difference between the inside and outside radius of the ring should be such as to provide sufficient metal in the sections 15 between the cut teeth 11 of the belt 9 to stand up under the final cutting action of the cutter when it is operating at the greatest depth of the teeth. It has been found that where the thickness of the metal remaining in the cut sections between the teeth 11 is .0559 inch or greater, that is sufficient to withstand the cutting action of the cutter on its final cut.

After the teeth have been cut on the ring 24, it is removed from the head 31 of the gear cutting machine 27 and is placed on a mandrel 32 having external grooves 33 cut therein to fit the teeth 11 on the ring 24. The mandrel 32 and the ring 24 thereon is then rotated while a grinding wheel 34 grinds or a tool (not shown) machines the outside periphery of the ring to reduce the thickness of the ring 24 in the sections 15 between the teeth 11 to the dimension required to provide the belt 9 with the required flexibility, which thickness as stated hereinbefore for the particular belt is reduced to .005 inch.

After the outside diameter of the ring 24 has been ground, the ring is removed from the mandrel 32 and given a heat treatment suitable to impart to the belt the necessary tensile strength to carry the loads to which the belt may be subjected, and to also increase the resiliency and flexibility of the belt.

It will be understood that the construction and method of making the geared power transmission belt described herein are given by way of example, and changes may be made in the construction of the belt and the method of making it without departing from the spirit of this invention, and it is intended to cover such changes in the appended claim.

Having thus described my invention, what I claim and desire to protect by Letters Patent is:

A positive drive transmission belt comprising a continuous non-articulated load carrying metal band, solid, inflexible, metallic tooth bodies, each tooth body having a top and base surface, said band extending across the said base surface of each tooth body, and being molecularly united to the tooth body at every point of the said base surface and having thin flexible portions bridging the space between successive teeth, said teeth being positioned in repeating spaced apart relationship, whereby said teeth and band form a homogeneous metallic product.

References Cited in the file of this patent

UNITED STATES PATENTS

| | | |
|---|---|---|
| 239,114 | Reese | Mar. 22, 1881 |
| 548,591 | Rau | Oct. 22, 1895 |
| 1,309,245 | Coryell | July 8, 1919 |
| 1,629,427 | Whitworth | May 17, 1927 |
| 1,728,172 | Bendix | Sept. 17, 1929 |
| 2,397,312 | Forrest | Mar. 26, 1946 |
| 2,627,756 | Bendall | Feb. 10, 1953 |
| 2,669,127 | Raser | Feb. 16, 1954 |

FOREIGN PATENTS

| | | |
|---|---|---|
| 1,998 | Great Britain | of 1858 |
| 637,354 | Great Britain | May 17, 1950 |
| 332,604 | Switzerland | Oct. 31, 1958 |